June 24, 1969 — W. JOSEPHIAN — 3,451,573
TRANSPORTING SYSTEM
Filed July 3, 1967 — Sheet 1 of 2
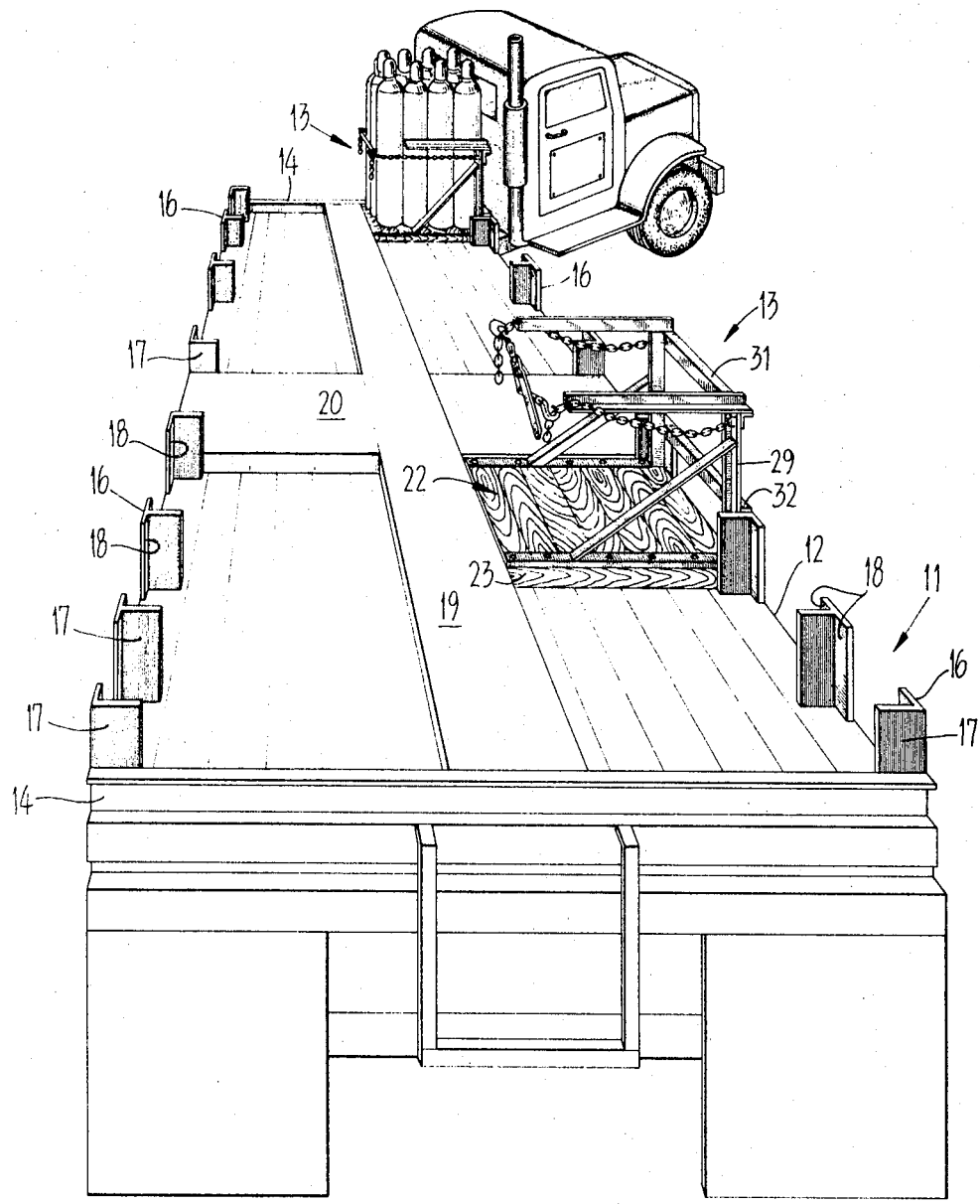
Fig_1
INVENTOR.
WILLIAM JOSEPHIAN
BY
Gardner & Zimmerman
ATTORNEYS

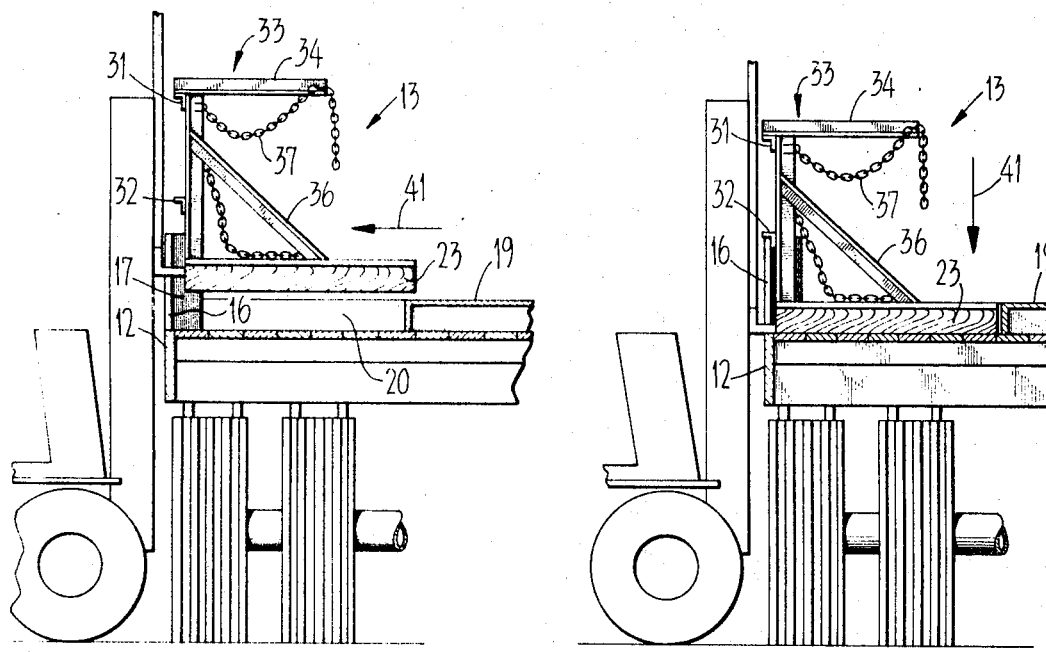
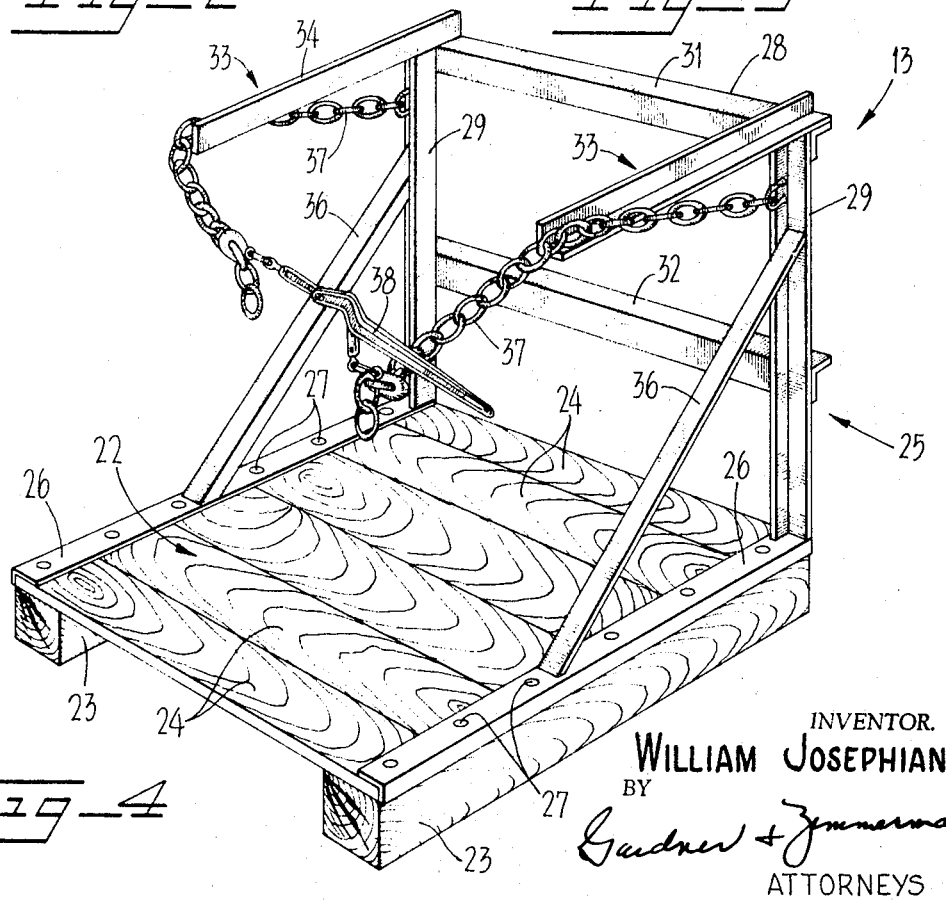

United States Patent Office 3,451,573
Patented June 24, 1969

3,451,573
TRANSPORTING SYSTEM
William Josephian, Oakland, Calif., assignor to Pacific Oxygen Company, Oakland, Calif., a corporation of California
Filed July 3, 1967, Ser. No. 650,823
Int. Cl. B60p 1/64; B62d 27/06
U.S. Cl. 214—515          8 Claims

ABSTRACT OF THE DISCLOSURE

A transporting system is described which facilitates simultaneous loading of a plurality of objects and individually unloading thereof. The system includes a transporting vehicle such as a truck-trailer which has a bed upon which is mounted structure for holding a plurality of pallets. Each of the pallets is adapted to hold a plurality of the objects and includes a base from which a supporting frame structure extends upwardly. An aisle on the trailer bed extends between the locations for the pallets and the edge of the bed to permit conveyance of objects removed from the pallet to the edge of the bed for unloading.

Background of the invention

This invention relates to a transporting system and, more particularly, to such a system which facilitates loading of a plurality of objects onto a transporting vehicle and yet permits simple unloading of individual ones of such objects.

On the hauling of commodities to be delivered to several different destinations, it is now the practice to load the commodities individually onto a transporting vehicle, and then unload the required number or amount at each destination. With many commodities, the loading of the commodities onto the transporting vehicle one by one and the unloading thereof, also individually, is a time consuming and often laborious task. This is particularly true in connection with the transportation of pressurized gas or liquid filled cylinders between the filling plant and customers. It is conventional now to transport such cylinders in flat bed trucks having edge railings to hold the cylinders vertically on the truck during transportation. The cylinders are usually loaded individually onto the truck by rolling them on end from a loading dock onto the truck. Besides this movement of the cylinders one by one being a time consuming procedure, it will be appreciated that large cylinders of this type are quite heavy and when any appreciable number of them are involved, movement of them is laborious. At each destination for one or more cylinders, they must likewise be individually unloaded from the truck.

Summary of the invention

The above invention provides a transporting system for commodities, such as the above described cylinders, in which the loading of a plurality of the commodities and unloading of individual ones thereof is greatly facilitated. Basically, the transporting system comprises a transporting vehicle which includes a load supporting bed having structure for holding on the bed a plurality of carriers, such as pallets, for the objects. Aisles on the bed extend between the locations for the carriers and the edges of the bed.

With this arrangement, the commodities can be placed on the carriers and then the carriers transported, as by means of a fork lift truck, to the transporting vehicle and placed in position. It should be readily apparent that the time and work involved in this mechanized loading of the carriers is quite insignificant relative to the time and work involved in loading individual ones of the commodities. The inclusion of the aisles permits individual ones of the commodities to be removed from the carriers and transported to the edge of the vehicle for unloading.

When the commodities or objects involved are pressurized fluid cylinders, the cylinders can be placed on the carriers immediately after being filled and then stored on them until the delivery time. If the commodities are objects being manufactured or assembled, they can be placed on the carriers immediately after manufacture or assemblage.

Brief description of the drawings

With reference to the drawings:

FIGURE 1 is a perspective view of a truck trailer transporting vehicle constructed in accordance with the invention and showing two pallet carriers in position thereon;

FIGURES 2 and 3 are partial end views of the trailer of FIGURE 1 illustrating succeeding steps in the mechanized loading of a pallet carrier onto the trailer in accordance with the invention; and FIGURE 4 is a perspective view of a preferred embodiment of a pallet carrier of the invention.

Description of the preferred embodiment

A preferred embodiment of the transporting system of the invention is illustrated in FIGURE 1. It comprises a truck trailer, generally referred to by the reference numeral 11, having a load supporting bed which includes structure for maintaining thereon a plurality of pallet carriers 13. More particularly, each end edge of bed 12 has an end rail 14 extending for its length, and the longitudinal edges of the truck bed have supporting brackets 16 at spaced locations therealong. As shown each supporting bracket 16 includes a vertical flange 17 which extends laterally inward from the edge of the bed to separate adjacent pallets from one another and prevent longitudinal movement thereof. Each bracket also includes vertical flanges 18 which extend along the bed edge to prevent the pallets from sliding laterally outward off the bed. It will be noted that the brackets at the corners of the bed only include one flange 18 which extends along its associated longitudinal bed edge in a direction away from the bed corner. The bed also has extending centrally thereof a raised platform 19 which is narrow relative to the width of the bed, and raised platform sections 20 extending laterally from platform 19 to the side edges of the bed. The upper surfaces of platforms 19 and 20 provide an aisle which extends lengthwise as well as widthwise of the truck bed.

End rails 14, supporting brackets 16, and the side edges of platforms 19 and 20 cooperate to maintain a plurality of pallet carriers 13 rigidly on bed 12. More particularly, these structures define recesses into which the pallet carriers are insertable. It is to be noted that the height of the upper surface of platforms 19 and 20 relative to the bed is substantially the same height as the upper surface of the pallet carrier bases. As will become more apparent hereinafter, this facilitates the loading and unloading of cylinders or other objects from the pallet. It will also be noted that the brackets 16 extend upwardly beyond the height of the platforms 19 and 20. This is likewise an important feature of the invention whose utility will be explained later.

Pallet carrier 13 is especially adapted for holding a plurality of elongated objects such as the above mentioned pressure cylinders. For a detailed description of pallet 13, reference is made to the enlarged view thereof in FIGURE 4. As shown there, the pallet includes a base 22 which can be formed of two spaced beams 23 and a floor of boards 24 extending therebetween. A supporting frame structure 25 extends upwardly from the base to provide lateral support for objects to be carried by the pallet. More particularly, the side edges of the base has metal angle iron edgings 26 suitably secured thereto such as by means of bolts 27. These edgings support a back frame 28 at the rear of the pallet. Frame 28 is comprised of two upwardly extending corner posts 29 having extending therebetween adjacent their upper ends a horizontal back angle iron rail 31. A second horizontal back rail 32 extends between post 29 at points which are generally midway between their ends.

Supporting frame 25 also includes side frame structures 33. More particularly, each side frame is made up of a horizontal bar 34 extending along the side of the pallet from the back frame, and a supporting side rail 36 extending angularly from the edging 26 at its respective side of the pallet to its associated corner post 29. It will be appreciate that besides acting as a portion of the side frame, rails 36 act as support members for back frame 25.

The supporting frame structure 25 also includes releasable or openable closure means across the front side of the pallet for maintaining objects such as gas filled cylinders within the frame structure. That is, a link chain 37 is secured to each of the posts 29 near its upper end. Such chains can be extended along the side frames around a load and suitably secured together at the front of the load. A conventional chain load binder 38 is provided for securing the chains together about the load.

As mentioned before, pallet carrier 13 is especially adapted for carrying and holding elongated objects such as gas filled cylinders. To illustrate the manner in which cylinders are held rigidly on a pallet carrier of the invention, one of the pallets shown on the truck bed in FIGURE 1 has a plurality of such cylinders secured therein.

Since the transporting system of the invention has been found to be particularly advantageous in the hauling and delivery of pressurized fluid cylinders, its operation will be described in connection with the loading and unloading of such cylinders. Immediately after these cylinders are filled, they can be placed on pallets 13 for storage until it is desired to transport a plurality of them to customers. At such time a fork truck can then be used to place the loaded pallets into position on bed 12.

It will be appreciated that while the pallets must be maintained substantially rigid on the truck, there must be some tolerance between the pallet supports and the pallet to permit easy placement of the pallets by the fork lift onto the truck bed without the necessity of precise alignment between the fork lift and the supporting bed. In this connection, reference is made to FIGURES 2 and 3 which show two successive stages in the loading of a pallet carrier. For simplicity sake the pallets are shown without a load. FIGURE 2 illustrates the position of a pallet after the fork lift truck has lifted it over the edge of the truck and is suspending the same over one of the recesses adapted to receive it. It will be noted that the pallet has been lowered to a position in which the lower rear edge thereof is below the top of the bracket supporting members whereas the front rear edge is still above the aisle platform. With the pallet in this position, the fork lift is backed away from the transporting vehicle to move the pallet laterally outward in the direction represented by arrow 41 until the lower edge of the pallet engages the longitudinal edge flanges 18 of the brackets 16. Then the operator of the fork lift can activate the same to lower the pallet into position as illustrated in FIGURE 3. This loading procedure is made possible because the bracket structure 16 extends to a height above that of the aisle platform 19.

With this type of arrangement unloading procedure, it will be appreciated that a very close tolerance can be provided in the lateral fit of the pallets in the bed supporting structure and yet the pallets can easily be placed into position. This close tolerance is important to prevent lateral shifting of the pallets during movement of the vehicle. The principal advantage of this close tolerance, however, is that the brackets and aisle cooperate to prevent the loaded pallets from tipping backward over the side of the transporting vehicle. That is, because of this close tolerance, the forward end of the pallet base of each pallet is unable to pivot upwardly as it would have to before the pallet could tip backwards. In this connection, the brackets 16 should be high enough that they extend above the center of gravity of the loaded pallets or sufficiently high that their upper ends act as fulcrum points for any backward tipping movement of a pallet so that upon such movement the forward end of the pallet base will be crowded against aisle platform 19.

To enable easy and rapid placement of the pallets onto the truck bed, however, the tolerance in the fit of the pallets in the direction longitudinally of the bed should not be quite as close. More particularly, the distance between the inwardly extending flanges 17 of adjacent brackets 16 should be greater than the width of the pallets across the rear edge thereof. This difference in width, though, need not be substantial. For example, in one embodiment of the invention which has been constructed, width of the pallets at their rear edge is 42 inches and the distance between the centers of the spaced flanges 17 is 45 inches. Loading and unloading of the pallets onto the truck bed of this embodiment has been accomplished without any delay caused by the fit of the pallets.

After the transporting vehicle is loaded with a pallet, it can be driven to the different destinations at which it is desired to deliver the objects. At each destination, the required number of cylinders can be easily unloaded. That is, if a full pallet is to be unloaded, a fork lift can be used to simply do the unloading. However, if it is desired to unload only a portion of the cylinders on one pallet, ready access to the pallet can be obtained by means of the aisles. The unloader can release the closure means of the pallet holding the cylinders to be unloaded and then roll them through the aisles to the edge of the truck for unloading. In this connection, because the aisles are substantially coextensive with the floor of the pallets, the movement of the cylinders from the pallets onto the aisles is facilitated.

As pointed out earlier, the loading and unloading procedure permitted by the structure of the invention is much simpler, less laborious, and most importantly, less time consuming than the prior conventional method of loading and unloading the cylinders one by one from a dock. Moreover, the structure of the invention assures that the load is evenly distributed on the transporting vehicle and that all the cylinders are tightly secured into place. In contrast, when cylinders are transported on a conventional flatbed truck having side rails, it will be appreciated that some shifting of weight is permitted and that it is not possible to obtain the tight compact arrangement of the cylinders obtained with use of the pallets of the invention.

What is claimed is:

1. Transporting apparatus which facilitates simultaneous loading of a plurality of objects and individual unloading thereof, comprising a transporting vehicle having a load supporting bed; structure on said bed for receiving and maintaining thereon a plurality of carriers, each of which is adapted to receive a plurality of said objects; and an aisle on said bed extending between the locations for said carrier and an edge of said bed for conveyance of individual ones of said objects from said carriers to said bed edge for unloading; said transporting apparatus including in the combination said carriers for placement in said structure on said bed, each of said carriers being a pallet comprising a rectangular base portion having a floor of a height to be flush with the upper surface of said aisle when said pallet is in said structure and a supporting frame extending upward from said base portion to provide lateral support for a plurality of objects on said pallet.

2. Transporting apparatus according to claim 1 wherein the supporting frame of each of said pallets comprises a back frame extending upwardly from a first edge of said base portion and two side frames extending upwardly from the edges of said base adjacent to said first edge, and releasable closure means extendable between said side frames to maintain objects within said supporting frame structure.

3. The load transporting apparatus of claim 1 wherein said load supporting bed is rectangular and comprises a flat bed surface having mounted thereon relatively narrow platforms having an uppermost planar surface raised above said surface defining said aisle, said platforms being positioned centrally of said bed in the longitudinal direction and having sections extending laterally from the central portion to the longitudinal edges of said bed, and wherein said structure includes pallet base supporting brackets positioned along the longitudinal edges of said bed and adapted to engage the base of pallets positioned on said bed surface to maintain the same substantially in abutment with said central longitudinal aisle.

4. The load transporting apparatus of claim 3 wherein said pallet base supporting brackets extend upwardly from said bed surface to a height greater than the height above said bed surface of the uppermost planar surface of said platform forming said central longitudinal aisle.

5. The load transporting apparatus of claim 3 wherein said pallet base supporting brackets extend upwardly from said bed surface to a height above the center of gravity of said pallets when said pallets support a plurality of said objects and are received on said bed whereby said brackets prevents the pallets from tipping pivotally over the longitudinal edges of said truck.

6. The load transporting apparatus of claim 3 wherein said pallet base supporting brackets extend upwardly from said bed surface to a height such that the upper ends thereof act as fulcrum points for any tipping pivotal movement over the longitudinal edges of said truck of pallets supporting a plurality of said objects and received on said bed surface whereby said brackets and said platform cooperate to prevent said tipping pivotal movement.

7. The load transporting system of claim 3 wherein said supporting brackets include a flange extending laterally inwardly from the edge of said bed to separate adjacent pallets from one another and prevent longitudinal movement thereof, and flanges extending longitudinally of said edge for abutment against said pallets to maintain the same on said bed in the lateral direction.

8. Transporting apparatus facilitating simultaneous loading of a plurality of objects and individual unloading thereof comprising a transporting vehicle having a load supporting bed; a plurality of load carrying pallets, each of which is adapted to receive a plurality of said objects and each of which has at least one side thereof openable to permit horizontal translation of individual ones of said objects from said pallets; and an aisle on said bed extending between the locations for said openable sides of said pallets and an edge of said bed for conveyance of individual ones of said objects from said pallets to said bed edge for unloading, the height of said aisle relative to said bed being substantially equal to the height of the floor surfaces of said pallets relative to the bottom thereof to provide a substantially coextensive surface between each of said pallet floors and said aisle to facilitate individual movement of said objects through the openable side of said pallets to said aisle without the necessity of lifting said objects.

References Cited
UNITED STATES PATENTS 1,349,209 8/1920 Kirchner.
2,596,478 5/1952 Gerhardt.
3,279,631 10/1966 McCartney _____ 214—84

ALBERT J. MAKAY, *Primary Examiner.*

U.S. Cl. X.R.

280—32.5; 296—28